United States Patent Office 3,194,684
Patented July 13, 1965

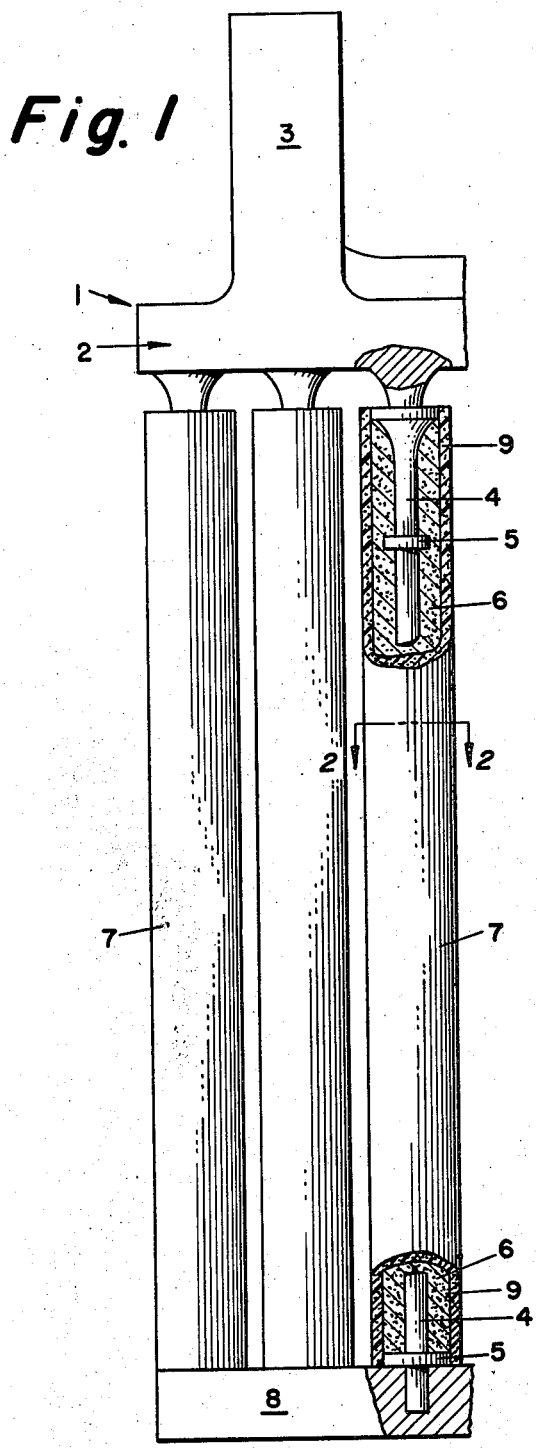
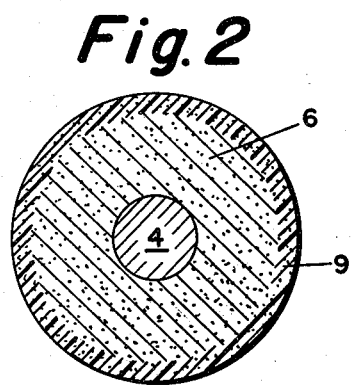
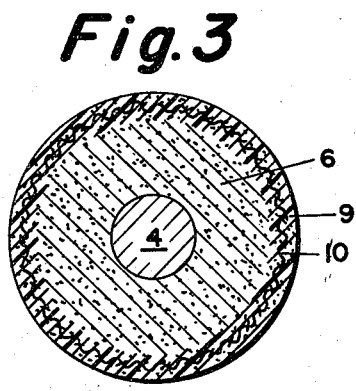
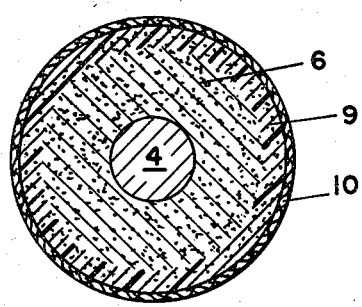

3,194,684
ELECTRIC STORAGE BATTERY ELECTRODE
Leland E. Wells, Fairhope, Ala., assignor to The Electric Storage Battery Company, a corporation of New Jersey
Filed Feb. 15, 1963, Ser. No. 258,861
7 Claims. (Cl. 136—6)

This invention relates to electric storage battery electrodes, and in particular, to retainers for containing active material in a tube-type electrode.

It is well known in the electric storage battery art to use slotted or otherwise perforated plastic or hard rubber tubes as active material retainers in tube-type electrodes. Electrodes employing perforated or slotted plastic or hard rubber tubes to contain active material have been successfully used in electric storage batteries, particularly those of the lead-acid type. There are several disadvantages inherent in using plastic or hard rubber retainers. One of the disadvantages is that the plastic or rubber retainers occupy space within the storage battery but contribute nothing toward increasing the electrical capacity of the battery. In fact, the plastic or rubber retainers actually increase internal battery electrical resistance. Furthermore, the operation of slotting or perforating the retainers consumes time and labor, and oftentimes requires expensive equipment.

It is an object of this invention to provide an electric storage battery electrode having retainers for the active material which increase the electrical capacity of the battery.

Another object of the invention is to provide porous retainers for storage battery active material which do not require expensive slotting or perforating operations.

A further object of the invention is to provide a tube-type storage battery electrode having a retainer for the active material which does not materially increase the internal resistance of the battery.

Other objects and purposes of this invention will be apparent to those skilled in the art in view of the following description, and with particular reference to the drawings, in which:

FIGURE 1 is an elevational view of a storage battery electrode is accordance with this invention, parts being broken away and sectioned to reveal details thereof;

FIGURE 2 is an enlarged sectional view taken on the line 2—2 of FIGURE 1;

FIGURE 3 is an enlarged transverse sectional view of an alternative retainer construction in accordance with this invention; and FIGURE 4 is an enlarged transverse sectional view of still another alternative retainer construction in accordance with this invention.

It has been discovered that retainers for tube-type electrodes may be prepared from electrolyte-resistant materials such as plastics or rubber which contain major amounts of active material. It has been found that rubber or plastics which contain electrochemically active material may be fabricated into tubular forms, such as by extrusion, which make excellent retainers for the active material. The plastic or rubber acts as a permanent binder or carrier for the active material which should be present in such amounts that it forms a continuous electrically conductive network. Since the active material forms a continuous electrically conductive network and is in direct contact with the electrode active material, it thereby increases the capacity of the electrode. Furthermore, since the material used to prepare the retainers is electrically conductive, it does not materially increase the internal resistance of the battery, and the presence of a major amount of active material in the plastic or rubber renders it porous.

The material which acts as a permanent binder or carrier for the active material incorporated therein must be electrolyte-resistant, i.e. if the electrode is to be used in acid electrolyte the material must be acid resistant and if the electrode is to be used in alkaline electrolyte the material must be alkali resistant. Examples of materials which may be used in either acids or alkali or both are plastics such as polyethylene, polyvinyl chloride and polystyrene, and natural and synthetic rubbers.

Though the concept of incorporating an electrochemically active material in an electrolyte resistant material and using this composition to form retainers may be used with any type of active material, it is particularly useful in preparing tubular positive electrodes for lead-acid batteries which utilize an oxide of lead active material. The active material may be milled into the plastic or rubber, and after thoroughly dispersing the active material in the plastic or rubber, this composition may be fabricated into tubes or any other desired shape or form of retainer.

The amount of active material incorporated in the plastic or rubber may vary over a wide range, though generally it will comprise a major portion of the composition. The amount of active material is to be used depends upon the type of active material, the type of plastic or rubber and the shape, size and thickness of the retainer. The critical limits are that there should be sufficient active material present to form a continuous electrically conductive network and thereby render the retainer electrically conductive, and there should be sufficient plastic or rubber present to bind the active material so that it can be fabricated into retainers having the required mechanical strength. For example, using a polyethylene plastic binder and a lead oxide ($Pb_3O_4$) active material, it has been found that a composition comprising about 92% by weight of lead oxide and about 8% by weight of polyethylene may be fabricated into a tubular retainer which is electrically conductive when placed in the acid electrolyte.

In order to increase the mechanical strength of the retainer, it may be used in combination with a highly perforated fabric. The term "fabric" as used herein includes all fabrics which are constructed, i.e. woven, knitted or plaited from threads formed of textile or glass fibers or filaments and including metal braid. Since the fabric is being used merely to reinforce the retainer it may be highly perforated. Such a fabric may be placed inside or outside the retainer or it may be incorporated into the retainer such as by extruding the plastic composition around it.

As previously indicated, the presence of a major amount of active material in the plastic or rubber renders retainers prepared therefrom porous. It is essential that the retainers be porous in order to permit the electrolyte to penetrate to the active material and thoroughly wet the active material. If necessary, a pore former material, such as starch, sugar, a soluble inorganic salt or a soluble thermoplastic resin, may be added to the rubber or plastic-active material composition, and after the retainer is formed, the pore former material can be removed to increase the porosity of the retainer. When a pore former material is employed, one must be careful not to leach the active material when removing the pore former.

In order to more specifically describe this invention, the drawings will now be referred to. In FIGURE 1, there is illustrated one form of a tube-type battery electrode 1 having a top bar 2 provided with a lug 3. Secured to the top bar are a plurality of metallic spines 4 which are aligned in a row and are spaced from each other. Each spine is provided with a plurality of discs 5 for centering the spine in the active material or material to become active 6. In addition, each metallic spine acts as a current collector. The tubes of active material 7 are supported at the bottom of the electrode by a bottom bar 8 which is preferably made of moldable insulating material such as rubber or plastic.

Enclosing the active material is a retainer 9 prepared by fabricating a plastic bonded active material in accordance with this invention. As more clearly shown in FIGURE 2, the active material 6 is held in position against the metallic spine 4 by the plastic retainer 9 which contains active material and which is microporous. Though the figures indicate that the retainer is prepared from plastic, it may also be prepared from natural or synthetic rubber.

FIGURES 3 and 4 illustrate alternative retainer constructions employing a highly perforated reinforcing fabric 10. In FIGURE 3, the reinforcing fabric is incorporated into the plastic-active material retainer which may be accomplished by extruding the retainer around the reinforcing fabric. FIGURE 4 illustrates wrapping the reinforcing fabric around the outside of the retainer. Alternatively, though not illustrated, the reinforcing fabric may be interposed between the retainer and the active material, but this is not preferred because the fabric might adversely affect the electrical contact between the retainer and the active material.

As used in the claims which follow, the term "electrolyte resistant material" includes plastics, natural rubber and synthetic rubber.

Having completely described this invention, what is claimed is:

1. A storage battery electrode comprising an electrochemically active material, a plurality of metallic spines disposed in said active material and porous retainers enclosing said active material about each of said metallic spines, said retainers being fabricated from an electrolyte resistant material which contains a major amount of said active material.

2. A storage battery electrode in accordance with claim 1 in which the electrolyte resistant material is a plastic.

3. A storage battery electrode in accordance with claim 1 in which the electrolyte resistant material is natural rubber.

4. A storage battery electrode in accordance with claim 1 in which the electrolyte resistant material is a synthetic rubber.

5. A storage battery electrode in accordance with claim 1 in which the active material is lead oxide.

6. A storage battery electrode in accordance with claim 1 in which a reinforcing, perforated fabric is disposed in said retainer.

7. A storage battery electrode in accordance with claim 1 in which a reinforcing, perforated fabric is disposed about said retainer.

References Cited by the Examiner
UNITED STATES PATENTS

| | | | |
|---|---|---|---|
| 2,526,591 | 10/50 | Szper | 136—146 |
| 3,011,007 | 11/61 | Evers et al. | 136—26 |
| 3,075,033 | 1/63 | Salkind | 136—24 |

JOHN H. MACK, *Primary Examiner.*

WINSTON A. DOUGLAS, *Examiner.*